Sept. 27, 1949.  E. L. MILLARD  2,483,098
SUPPLYING AGENTS TO THE DIGESTIVE TRACT
Filed Jan. 9, 1946
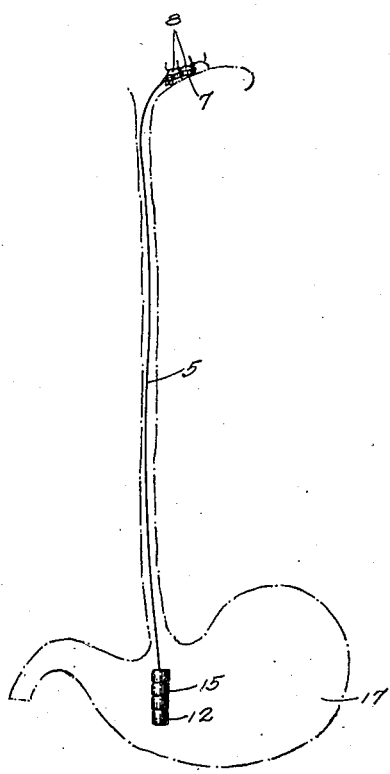
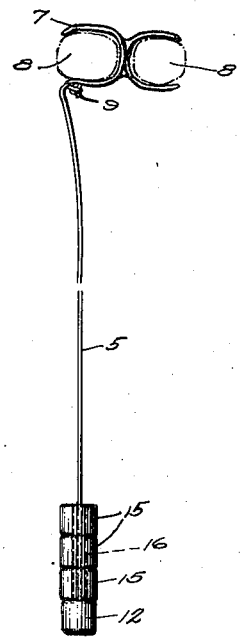
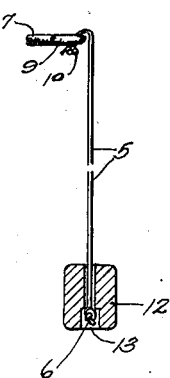
INVENTOR.
Everett L. Millard
BY J. Stanley Preston
his ATTORNEYS Patented Sept. 27, 1949

2,483,098

UNITED STATES PATENT OFFICE 2,483,098

SUPPLYING AGENTS TO THE DIGESTIVE TRACT

Everett L. Millard, Highland Park, Ill.

Application January 9, 1946, Serial No. 640,029

1 Claim. (Cl. 128—1)

This invention relates to means for furnishing reactive and action-producing agents to the digestive tract, and especially the upper part of the digestive tract.

When substances such as chemical agents for example are introduced into the digestive tract in the normal manner by swallowing, their effects usually are of comparatively short duration, because it is the function of the digestive tract to rapidly pass on whatever foreign elements it may receive. The substances therefore act quickly but for short periods if they are readily soluble, and if they are only slowly soluble may be eliminated before they give the desired results. Thus, for instance it is difficult to maintain an alkaline condition in the stomach since any alkalizing agent in the stomach is disposed of rather quickly.

My invention overcomes this tendency to fast and temporary action, and is capable of maintaining a substance for example an alkalizing agent within the stomach for long periods of time, and even continuously indefinitely if desired. To this end the substance is provided in the form of slowly soluble pellets, or is incorporated with a solid slowly soluble or otherwise slowly yielding binder into pellet form, and one or more of these pellets at a time is tethered in the stomach from the patient's teeth. The tethering arrangement may be and preferably is such that dissolved pellets are readily replaced by others without removing the tether as appears hereafter.

The accompanying drawings illustrate the preferred form of the invention as used with an alkalizing agent. Fig. 1 illustrates the tethering of pellets in the stomach through the alimentary canal. Fig. 2, drawn to a larger scale, illustrates this whole apparatus somewhat more clearly. Fig. 3, partly in section, illustrates a preferred detail.

The apparatus of my invention comprises a tether or string 5, having at its upper end a securing element for anchoring it to the teeth of the patient, such as a loop, preferably formed with a slip-knot so that it can be both firmly attached to the teeth and easily released therefrom, and preferably some means at its lower end to retain pellets dropped down to it such as a knot 6 forming an enlargement. To prevent irritation by the natural movements of, say the stomach, the string or tether 5 may be made of an elastic material, such as a rubber compound; however other suitable materials may be used, preference being given to a material non-irritating to the membranes and deleteriously attacked to a minimum extent by the body fluids and bacteria to which it is exposed. The tether can be attached directly to one or more of the patient's teeth, as by a loop at the end of the tether as mentioned before, but preferably a bracket or clasp 7 is fitted to, say, one or two of the patient's lower molars 8 and provided with some convenient attachment for the tether, for example a small hook or loop 9 of the metal of the clasp through which the tether 5 can be drawn, Fig. 2, and anchored by means of a knot 10 in the tether. I prefer such an anchoring arrangement. Preferably too, in order to provide an enlargement of adequate size at the lower end of the tether 5 and one not unduly irritating to the membranes, I supplement such a knot as 6 by a, say, cylindrical bead 12 having deeply rounded edges and resting on the knot 6, the tether passing through a hole pierced in the bead and the hole being countersunk as at 13 to receive the knot as appears in Fig. 3. The bead 12 may be made of glass, plastic or some other material not rapidly attacked by the body fluids.

The pellets 15 may then be in the form of annular pellets, each being pierced with a hole 16 so that it can be threaded onto the string or tether 5 at its upper end and then slipped down to, say, the bead 12 or to another (new or partly consumed) pellet already held by the bead, Fig. 2. Each pellet 15 can be made small enough to swallow without difficulty, and where necessary to secure an adequate quantity, two or more of the pellets can be suspended by the tether 5 in the desired location simultaneously as indicated in Figs. 1 and 2. In Fig. 1, the pellets are shown as suspended in the stomach 17.

As before indicated, the pellets 15 will usually be desired in a rather slowly soluble or disintegratable form, in order that rapid replacement of the pellets may not be necessary, and say to this end, where necessary or desired, the substance whose effect is wanted can be mixed with a suitably slowly disintegratable binder or other associated material. For example, calcium carbonate and magnesium carbonate are suitable for alkalization, but pellets formed from them with common sugar as a binder break up and digest rather rapidly. However suitable pellets 15 can be formed by, for example, mixing about ninety-eight and one-half parts of calcium carbonate ($CaCO_3$) in finely divided powdered form, one part of sodium bicarbonate ($NaHCO_3$) and one-half of one part of rosin, the latter constituting a binder; the proportions are by weight. The bicarbonate will disintegrate from such a pellet under the action of the body fluids and release the calcium carbonate gradually; a pellet of such composition will last for some hours. A desired rate of discharge of the alkalizing agent from a slowly soluble composition can be obtained by the use of a sufficiently large pellet or by the simultaneous use of a sufficient number of smaller (and hence more easily swallowed) pellets, as will be understood and as indicated in the drawings.

In the use of the apparatus illustrated, the clasp 7 may be placed around the patient's teeth. The bead 12 may then be swallowed, with or without one or more pellets 15 threaded on the tether and resting at the bead, this or these carrying the bead end of the tether down also while the upper end of the tether is retained in or outside the mouth. As necessary, one or more pellets 15 may now be threaded onto the upper end of the tether held outside the mouth and this or these swallowed also and coming to rest at the lower end of the tether. The upper end of the tether 5 is then slipped into the hook 9 of the clasp and drawn through it until the knot 10 stops further movement. The pellets are then suspended securely. The tether 5 is made of the proper length of course to retain the pellets in the desired position, say about as indicated in the stomach 17 in Fig. 1. Experience has shown that such a tether can be retained for long periods without discomfort, and apparently without ill effects. When a further supply of pellets is required, the upper end of the tether can be detached from the clasp by the patient's fingers and drawn slightly beyond the lips of the patient, then one or more pellets threaded onto it and swallowed one or more at a time, and then the tether returned to its holding hook 9.

It will be understood of course that my invention is not limited to the details illustrated in the drawings and mentioned above, except as appears hereafter in the claim.

I claim:

In apparatus for furnishing reactive and action-producing agents in the form of perforated pellets to the digestive tract, a tether to extend from the mouth down the gullet, a clasp attached to the upper end of the tether of a size to snugly engage at least one tooth, and a bead of material not readily attacked by body fluids at the lower end of the tether to retain on the tether pellets encircling the tether.

EVERETT L. MILLARD.

REFERENCES CITED

The following references are of record in the file of this patent:

UNITED STATES PATENTS

| Number | Name | Date |
| --- | --- | --- |
| 11,942 | Myers | Nov. 14, 1854 |
| 2,035,135 | Lebow | Mar. 24, 1936 |

OTHER REFERENCES

"The Practice of Medicine," J. C. Meakins, 3rd edition, 1940, published by C. V. Mosby Co., St. Louis, Mo., page 598.